United States Patent [19]

Berrett

[11] Patent Number: 4,685,628

[45] Date of Patent: Aug. 11, 1987

[54] FEED MECHANISM FOR A DEBONING MACHINE OR THE LIKE

[75] Inventor: Douglas R. Berrett, Sandy, Utah

[73] Assignee: Beehive Machinery, Inc., Sandy, Utah

[21] Appl. No.: 773,420

[22] Filed: Sep. 6, 1985

[51] Int. Cl.⁴ ............................................. B02C 18/00
[52] U.S. Cl. ................................... 241/236; 241/260.1
[58] Field of Search .............................. 198/663, 671; 241/101.2, 186 A, 236, 247, 245, 260.1, 261

[56] References Cited

U.S. PATENT DOCUMENTS

| | | | |
|---|---|---|---|
| 858,354 | 6/1907 | Sharpneck | 241/260.1 X |
| 4,092,004 | 5/1978 | Leverenz et al. | 241/101 B X |
| 4,424,891 | 1/1984 | Dudley et al. | 241/186 A X |
| 4,466,809 | 8/1984 | Kissel et al. | 241/260.1 X |

Primary Examiner—Timothy V. Eley

Attorney, Agent, or Firm—Burmeister, York, Palmatier, Hamby & Jones

[57] ABSTRACT

Pieces of bony meat, fowl, fish or the like descend through a receiving hopper or duct and are transported by a pair of feed screws, out of the hopper through an exit opening in one end thereof. The hopper has side walls which may converge downwardly, in a known manner, but also have novel longitudinally converging side wall portions, opposite the feed screws, which converge toward each other and toward the feed screws in the exit direction, to afford tapered spaces between the longitudinally converging side wall portions and the feed screws, for enabling pieces to enter such tapered spaces and to become engaged with the feed screws for transportation in the exit direction. The feed screws preferably have overlapping screw flights of opposite hand, and rotate in opposite directions such that the flights propel the pieces into the tapered spaces.

7 Claims, 2 Drawing Figures

FEED MECHANISM FOR A DEBONING MACHINE OR THE LIKE

FIELD OF THE INVENTION

This invention relates to a feed mechanism for receiving pieces of bony meat, fowl or fish, and for feeding such pieces to a deboning machine, or to some other machine for processing such pieces. The invention is also applicable to feed mechanisms for machines which process pieces of other food materials, and other similar feed mechanisms.

BACKGROUND OF THE INVENTION

This invention arose as an improvement in the general type of deboning or separating machine, disclosed and claimed in the copending patent application of Archie Rae McFarland and Bruce L. Preece, Ser. No. 572,155, filed Jan. 18, 1984 and entitled SEPARATING MACHINE HAVING OVERLAPPING SCREW PUMP. The disclosure of such application is hereby incorporated by reference herein. However, the feed mechanism of the present invention is applicable to many other types of machines.

In the McFarland and Preece machine, pieces of bony meat, fowl or fish material are received by a hopper or duct, through which the pieces descend to a pair of rotary horizontal feed screws having overlapping screw flights. The pieces become engaged with the feed screws and are transported horizontally out of the hopper through an exit opening in one end thereof. The feed screws deliver the pieces to a rotary screw pump which carries the pieces to the receiving end of a separating or deboning mechanism, adapted to separate soft meat or fleshy components from the bony and other hard components of the meat, fowl or fish.

In the feed mechanism of the McFarland and Preece machine, some of the larger pieces of meat, fowl or fish material have sometimes not immediately become engaged with the feed screws, but tend to tumble on the rotating feed screws at the bottom of the hopper.

SUMMARY OF THE INVENTION

One principal object of the present invention is to overcome this difficulty, by providing a new and improved feed mechanism, which is constructed and arranged so that even the larger pieces of bony meat, fowl and fish materials will immediately become engaged with the feed screws, so as to be transported by the screws out of the hopper or duct.

Another object is to provide a new and improved feed mechanism which accomplishes these new results, at very little or no additional cost.

To achieve these and other advantages and new results, the present invention may provide a feed mechanism for a deboning machine, comprising a double convergent in-feed hopper for receiving pieces of material such as bony meat, fowl or fish; the hopper having a bottom wall portion and opposite side walls converging downwardly and joining with the bottom wall portion; the hopper having opposite end walls with an exit opening in one of the end walls adjacent the bottom wall portion; a pair of generally parallel rotary feed screws disposed in the hopper in close proximity with the bottom wall portion for transporting the pieces in a longitudinal exit direction along the axial directions of the feed screws and out of the hopper through the exit opening; the opposite side walls having longitudinally converging side wall portions disposed opposite the feed screws and converging toward each other and toward the feed screws in the exit direction whereby the side walls are doubly convergent, both downwardly and in the exit direction; the converging side wall portions affording tapered spaces between such converging side wall portions and the feed screws for enabling large pieces to enter the spaces and become engaged with the feed screws for transportation in the exit direction.

In the feed mechanism, the longitudinally converging side wall portions preferably converge generally symmetrically with respect to the feed screws.

The feed screws preferably have overlapping screw flights of opposite hand, and the feed screws are rotatable in opposite directions such that the flights are moving downwardly adjacent the longitudinally converging side wall portions to draw the pieces downwardly into the tapered spaces between the converging side wall portions and the feed screws.

In broader terms, the present invention provides a feed mechanism for a deboning machine, comprising a double convergent in-feed duct for receiving pieces of material such as bony meat, bony fowl or bony fish; the duct having a pair of opposite side walls, a pair of opposite end walls, and a transverse wall portion therebetween; one of the end walls having at least one exit opening therein; a pair of rotary feed screws disposed in the duct in close proximity to the transverse wall portion for transporting the pieces in an exit direction along the axes of the feed screws and outwardly through the exit opening; the side walls being convergent toward each other in a direction toward the feed screws; the side walls having a pair of converging side wall portions opposite the feed screws and converging toward each other in the exit direction whereby the side walls are doubly convergent, both toward the feed screws and in the exit direction; the converging side wall portions affording at least one tapered space tapering in the exit direction between at least one of the converging side walls and the adjacent feed screw for enabling large pieces to enter the tapered space to become engaged with the feed screws for transportation in the exit direction.

Preferably, the feed screws are generally parallel and have overlapping flights of opposite hand, the feed screws being rotatable in opposite directions such that the pieces are propelled into the tapered space for engagement with the feed screws and transportation in the exit direction.

Preferably, the converging side wall portions are generally symmetrical relative to the feed screws and converge toward the feed screws to afford a pair of tapered spaces between the converging side wall portions and the feed screws; the feed screws rotating in opposite directions such that the flights of opposite hand are moving into the tapered spaces to propel the pieces into such spaces for engagement with the feed screws and transportation in the exit direction.

BRIEF DESCRIPTION OF THE DRAWINGS

Further objects, advantages and features of the present invention will appear from the following description, taken with the accompanying drawings, in which.

DETAILED DESCRIPTION OF AN ILLUSTRATIVE EMBODIMENT

Figure 1:
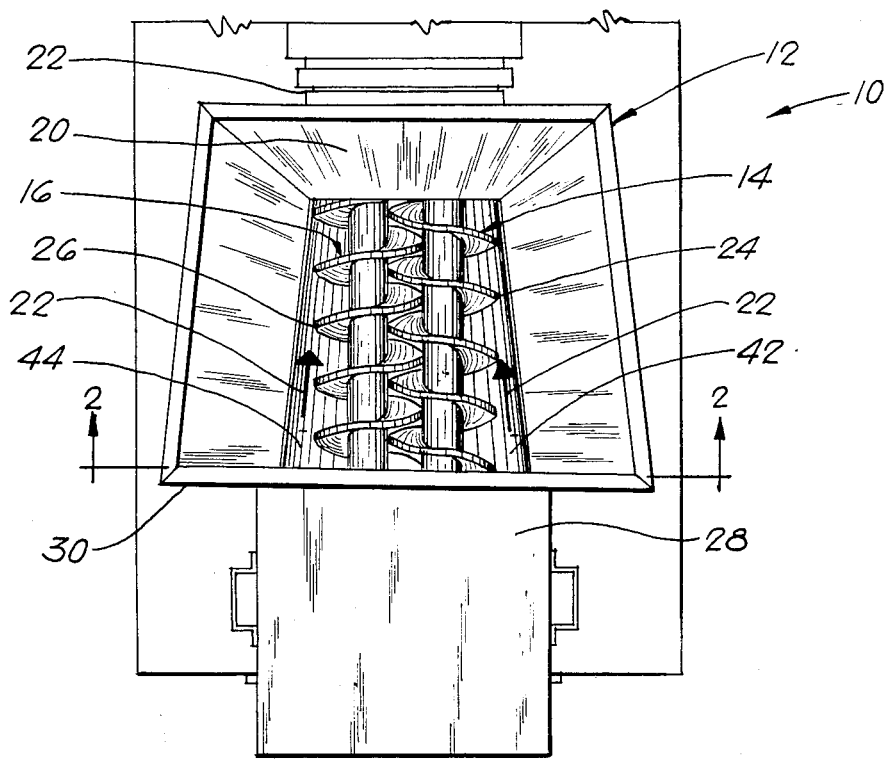
FIG. 1 is a somewhat diagrammatic plan view of a feed mechanism to be described as an illustrative embodiment of the present invention.
Figure 2:
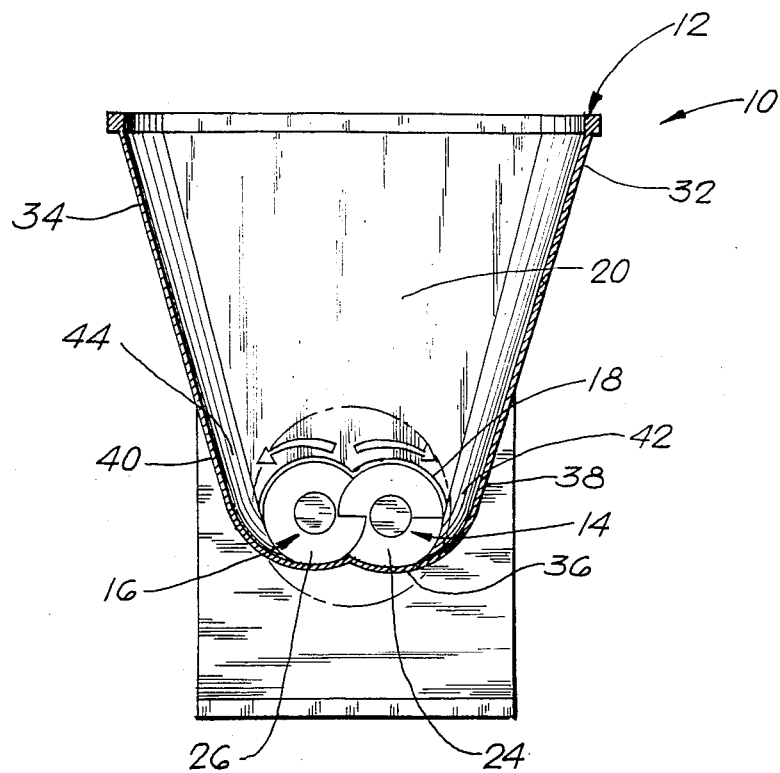
FIG. 2 is a vertical section, taken generally along the line 2—2 in FIG. 1.

FIGS. 1 and 2 illustrate an exemplary feed mechanism 10 which was developed as an improvement upon the corresponding feed mechanism disclosed in the previously mentioned McFarland and Preece patent application, Ser. No. 572,155, filed Jan. 18, 1984, particularly FIGS. 1–5 of such application. Some of the details of the present feed mechanism 10 are the same as disclosed in such McFarland and Preece application, as will be indicated presently.

The present feed mechanism 10, as shown in FIGS. 1 and 2, comprises a receiving hopper or duct 12, adapted to receive pieces of bony meat, fowl or fish material, or various other pieces of material. The pieces descend or travel into engagement with a pair of feed screws 14 and 16, which transport the pieces longitudinally out of the hopper 12 through at least one exit opening 18, formed in one end wall 20 of the hopper. The pieces are transmitted along the axes of the feed screws 14 and 16, and in an exit direction, as indicated by arrows 22 in FIG. 1. As shown, the feed screws 14 and 16 deliver the pieces of material to a rotary screw pump 22, as in the previously mentioned McFarland and Preece application, but in other machines, the pieces of material may be delivered to various other components of the machine.

The feed screws 14 and 16 preferably are substantially parallel and are provided with overlapping screw flights 24 and 26 of opposite hand, one being left-handed and the other right-handed. A drive mechanism 28 is provided to rotate the rotary screws 14 and 16, preferably in opposite directions, one being driven clockwise while the other is driven counterclockwise, as indicated by the directional arrows in FIG. 2. The drive mechanism 28 is shown diagrammatically in FIG. 1 and may be of any known or suitable construction, such as the construction disclosed in the previously mentioned McFarland and Preece application. The hopper 12 has a second end wall 30, on which the drive mechanism 28 is mounted, the second end wall 30 being on the opposite end of the hopper from the first end wall 20.

The hopper 12 also has first and second opposite side walls 32 and 34, as well as a bottom or transverse wall 36 extending therebetween. The feed screws 14 and 16 are rotatable in close proximity with the bottom wall 36.

The side walls 32 and 34 converge downwardly, in the known manner, as disclosed in the McFarland and Preece application. However, the side walls 32 and 34 have side wall portions 38 and 40, opposite the feed screws 14 and 16, which also converge longitudinally, in the exit direction, toward each other and toward the feed screws 14 and 16.

The converging side wall portions 38 and 40 form tapered spaces 42 and 44, between the side wall portions and the feed screws 14 and 16. The tapered spaces 42 and 44 might be described as triangular, in that they are relatively wide, near the end wall 30, while tapering to a narrow width, near the opposite end wall 20, where the side wall portions 38 and 40 are close to the feed screws 14 and 16.

As previously mentioned, the feed screws 14 and 16 are rotated in opposite directions, such that the screw flights 24 and 26 are moving into the tapered spaces 42 and 44, so that the screw flights propel the pieces of material into the tapered spaces 42 and 44.

The larger pieces of material are able to enter the tapered spaces 42 and 44, at their wider ends, so that the pieces will become engaged with the flights 24 and 26 of the screws 14 and 16, whereupon the pieces will be transported in the exit direction 22, through the exit opening 18 and out of the hopper 12. The pieces are delivered to the screw pump 22, or any other device which is adapted to receive the pieces of material from the hopper 12.

At least one of the side wall portions 38 and 40 needs to converge toward the corresponding screw flight, so as to form at least one tapered space, but preferably both of the side wall portions 38 and 40 converge toward the screw flight 24 and 26 to afford a symmetrical construction.

The provision of the converging side wall portions 38 and 40 increases the efficiency of the feed mechanism 10, and the ability of the feed mechanism to discharge the pieces of material at a faster rate.

Other modifications, alternative constructions and equivalents may be employed, within the true spirit and scope of the present invention, as disclosed and claimed herein.

I claim:

1. A feed mechanism for a deboning machine comprising
   a double convergent in-feed hopper for receiving pieces of material such as bony meat, fowl or fish,
   the hopper having a bottom wall portion and opposite side walls converging downwardly and joining with the bottom wall portion;
   the hopper having opposite end walls with an exit opening in one of the end walls adjacent the bottom wall portion;
   a pair of generally parallel rotary feed screws disposed in the hopper in close proximity with the bottom wall portion for transporting the pieces in a longitudinal exit direction along the axial directions of the feed screws and out of the hopper through the exit opening;
   the opposite side walls having longitudinally converging side wall portions disposed oppostie the feed screws and converging toward each other and toward the feed screws in the exit direction whereby the side walls are doubly convergent, both downwardly and in the exit direction;
   the converging side wall portions affording tapered spaces between such converging side wall portions and the feed screws for enabling large pieces to enter the spaces and become engaged with the feed screws for transportation in the exit direction.

2. A feed mechanism according to claim 1,
   in which the longitudinally converging side wall portions converge generally symmetrically with respect to the feed screws.

3. A feed mechanism according to claim 2,
   in which the feed screws have overlapping screw flights of opposite hand,
   the feed screws being rotatable in opposite directions such that the flights are moving downwardly adjacent the longitudinally converging side wall portions to draw the pieces downwardly into the tapered spaces between the converging side wall portions and the feed screws.

4. A feed mechanism for a deboning machine, comprising
   a double convergent in-feed hopper for receiving pieces of material such as bony meat, fowl or fish;

the hopper having a bottom wall portion and opposite side walls converging downwardly and joining with the bottom wall portion;

the hopper having opposite end walls with an exit opening in one of the end walls adjacent the bottom wall portion;

a pair of generally parallel rotary feed screws disposed in the hopper in close proximity with the bottom wall portion for transporting the pieces in a longitudinal exit direction along the axial directions of the feed screws and out of the hopper through the exit opening;

the opposite side walls having longitudinally converging side wall portions disposed opposite the feed screws and converging toward each other and toward the feed screws in the exit direction whereby the side walls are doubly convergent, both downwardly and in the exit direction;

the converging side wall portions affording tapered spaces between such converging side wall portions and the feed screws for enabling large pieces to enter the spaces and become engaged with the feed screws for transportation in the exit direction;

the feed screws having overlapping flights of opposite hand;

the feed screws being rotatable in opposite directions such that the flights are moving downwardly opposite the converging side wall portions to propel the pieces into the tapered spaces for engagement with and transportation by the feed screws in the exit direction.

5. A feed mechanism for a deboning machine, comprising a double convergent in-feed duct for receiving pieces of material such as bony meat, bony fowl or bony fish, the duct having a pair of opposite side walls, a pair of opposite end walls, and a transverse wall portion therebetween;

one of the end walls having at least one exit opening therein;

a pair of rotary feed screws disposed in the duct in close proximity to the transverse wall portion for transporting the pieces in an exit direction along the axes of the feed screws and outwardly through the exit opening;

the side walls being convergent toward each other in a direction toward the feed screws;

the side walls having a pair of converging side wall portions opposite the feed screws and converging toward each other in the exit direction whereby the side walls are doubly convergent, both toward the feed screws and in the exit direction;

the converging side wall portions affording at least one tapered space tapering in the exit direction between at least one of the converging side walls and the adjacent feed screw for enabling large pieces to enter the tapered space to become engaged with the feed screws for transportation in the exit direction.

6. A feed mechanism according to claim 5, in which the feed screws are generally parallel;

the feed screws having overlapping flights of opposite hand;

the feed screws being rotatable in opposite directions such that the pieces are propelled into the tapered space for engagement with the feed screws and transportation in the exit direction.

7. A feed mechanism according to claim 5, the feed screws being generally parallel;

the converging side wall portions being generally symmetrical relative to the feed screws and converging toward the feed screws to afford a pair of tapered spaces between the converging side wall portions and the feed screws;

the feed screws having overlapping flights of opposite hand;

the feed screws rotating in opposite directions such that the flights are moving into the tapered spaces to propel the pieces into such spaces for engagement with the feed screws and transportation in the exit direction.

* * * * *